(No Model.)
J. SANDER.
MEAT CHOPPING MACHINE.
No. 249,405.　　　　　　　　　　Patented Nov. 8, 1881.
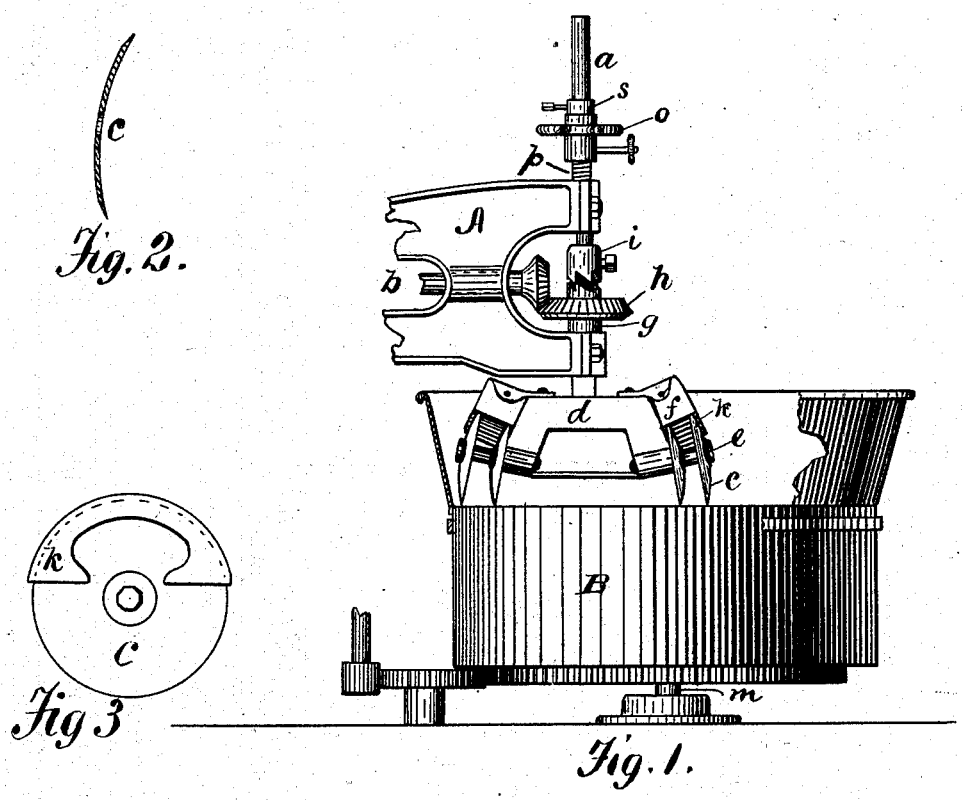
Charles H. Pell
Chas. Herr.
Witnesses.
John Sander,
Inventor,
by O. Drake, Att'y.

UNITED STATES PATENT OFFICE.

JOHN SANDER, OF NEWARK, NEW JERSEY.

MEAT-CHOPPING MACHINE.

SPECIFICATION forming part of Letters Patent No. 249,405, dated November 8, 1881.

Application filed May 11, 1881. (No model.)

*To all whom it may concern:*

Be it known that I, JOHN SANDER, a resident of Newark, in the county of Essex and State of New Jersey, have invented certain new and useful Improvements in Meat Chopping and Mixing Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain detailed improvements in a meat-cutting device secured by Letters Patent No. 199,317, granted to me January 15, A. D. 1878, the object being to facilitate the action of the same, and thereby secure better results, and to otherwise perfect the arrangement and operation of the mechanism, so as to reduce the amount of wear upon the block, as will be fully explained.

It consists in the herein-described combinations, conformations, and arrangements of parts hereinafter set forth, illustrated, and claimed.

Referring to the accompanying drawings, in which similar letters of reference indicate like parts in each of the several figures, Figure 1 is a side elevation of a portion of my meat-cutting device embodying the improvements, and Figs. 2 and 3 are detail figures, all of which will be more particularly described.

In carrying out my invention I construct the supporting-arm A and block B substantially as before, the former carrying the vertical shaft $a$, operated by a driving-shaft, $b$, and the latter slowly revolving eccentrically with regard to the vertical shaft $a$ upon the center $m$, driven by a train of cogs, &c., connected with the driving-shaft $b$. Said block engages with the cutters $c$ to cut the meat, as before. The vertical shaft $a$ actuates the truck or horizontal shaft $d$, having projecting arms or spindles $e$ adjusted at an angle with the upper face of the block. Upon said spindles are secured improved cutters, concavo-convex in shape, which travel over the face of the block to cut the meat. A sectional view of one is shown in Fig. 2. The object of the peculiar shape of the cutter and its arrangement upon the shaft is to produce a more perfect cut to the meat and reduce the amount of wear upon the block, the tendency of the original cutter having been to tear the surface of the block in its passage upon the face thereof. This is now done away with by the arrangement herein shown.

Above the cutter are secured guards $f$, adapted to prevent the meat from flying off when the cutters are in rapid motion. Said guards are returned, as shown at K, Figs. 1 and 3, over upon the sides of the cutters, by which means the said cutters are kept clear of all adhering meat. Similar cleaning-blades are secured so as to bear upon the inner faces of the cutters for the same purpose. The cutters, by revolving between said clearing-blades, are kept free from all collecting matter which might interrupt the proper operation of the machine.

I have also improved the machine so as to more quickly disconnect the cutting mechanism from the driving mechanism by securing upon the vertical shaft $a$ a loose clutching-collar, $g$, carrying the beveled-gear wheel $h$, which engages with a similar wheel upon the driving-shaft $b$. Above said loose collar $g$ is secured a fast clutching-collar, $i$, which engages with the collar $g$, as will be evident upon reference to Fig. 1.

Means are provided for raising and lowering the shaft $a$ with the fast clutching-collar thereon from and into operative engagement with the loose collar—as, for instance, the hand-wheel $o$, working upon the screw $p$ and fast collar $s$.

As the block and knives wear away the fast collar $s$ can be changed in position to take up said wear. A vertical adjustment upon the block causes a peculiar and destructive tearing action upon the face thereof, which is caused by said vertically-adjusted knife, as it cuts into the block, twisting in such a manner as to separate and tear the fibers of the wood. This peculiar action of the knives upon the block is prevented by my method of constructing and arranging the knives, as herein described, the shape of the knives, in conjunction with the manner of adjusting them, preventing the before-mentioned twisting. The cutting-edge, because of the concavo-convex shape of the cutter, is curved to correspond with the direction of revolution of the cutter around the vertical shaft $a$; and, further, because the said concavo-convex cutter revolves on an inclined axis in the manner shown, the edge of said cutter passes vertically into the wood. These said actions taken together produce a clean cut and obviate the twisting and tearing process before mentioned. It is evident that the result which I attain could not be accomplished alone by either an inclined knife with a plain disk or by concavo-convex knives vertically adjusted.

Rollers having beveled peripheries may be substituted for the knives, the same being adapted to reduce the mass upon which it is operating to impalpable powder or jelly.

Having thus described my invention, what I claim, and wish to secure by Letters Patent, is—

1. In a meat-cutter, the combination, with a revolving block having a plain upper surface, of concavo-convex cutting-knives centered upon inclined spindles, said spindles rotating upon a center eccentric to said revolving block, substantially as and for the purposes set forth and shown.

2. The combination, in a meat-cutting device, of the vertical shaft $a$, horizontal shaft $d$, inclined spindles $e$, concavo-convex cutters $c$, all arranged and operating substantially as and for the purposes set forth.

3. In a mechanism for cutting or mincing meat, a rotating shaft, $d$, carrying inclined spindles with means thereon adapted to cut or otherwise reduce the meat to particles, substantially as and for the purposes set forth and shown.

4. A meat cutting or mincing machine having cutters or mincers working on inclined spindles, substantially as and for the purposes set forth and shown.

In testimony that I claim the foregoing I have hereunto set my hand this 14th day of April, 1881.

JOHN SANDER.

Witnesses:
CHARLES H. PELL,
OLIVER DRAKE.